(12) United States Patent
Wei

(10) Patent No.: US 8,547,871 B2
(45) Date of Patent: Oct. 1, 2013

(54) METHOD AND DEVICE FOR GENERATING AND REPORTING OVERLOAD INDICATOR REPORT

(75) Inventor: Wei Wei, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 249 days.

(21) Appl. No.: 13/203,076

(22) PCT Filed: Sep. 23, 2009

(86) PCT No.: PCT/CN2009/074151
§ 371 (c)(1),
(2), (4) Date: Aug. 24, 2011

(87) PCT Pub. No.: WO2010/102487
PCT Pub. Date: Sep. 16, 2010

(65) Prior Publication Data
US 2011/0310763 A1      Dec. 22, 2011

(30) Foreign Application Priority Data
Mar. 10, 2009   (CN) .......................... 2009 1 0079421

(51) Int. Cl.
*H04L 12/26*      (2006.01)
(52) U.S. Cl.
USPC ........................................................ 370/252
(58) Field of Classification Search
None
See application file for complete search history.

(56) References Cited

U.S. PATENT DOCUMENTS

| | | | |
|---|---|---|---|
| 2008/0253300 A1* | 10/2008 | Wakabayashi et al. | 370/252 |
| 2009/0161619 A1* | 6/2009 | Noma | 370/329 |
| 2009/0179755 A1* | 7/2009 | Bachl et al. | 340/540 |
| 2010/0182903 A1* | 7/2010 | Palanki et al. | 370/225 |
| 2011/0223929 A1* | 9/2011 | Boudreau et al. | 455/452.1 |

FOREIGN PATENT DOCUMENTS

| | | |
|---|---|---|
| CN | 101272549 A | 9/2008 |
| CN | 101299891 A | 11/2008 |
| WO | 2007101510 A1 | 9/2007 |

OTHER PUBLICATIONS

International Search Report for PCT/CN2009/074151, English Translation attached to original, Both completed by the Chinese Patent Office on Dec. 8, 2009, All together 4 Pages.

* cited by examiner

*Primary Examiner* — Chirag Shah
*Assistant Examiner* — Amar Persaud
(74) *Attorney, Agent, or Firm* — Brooks Kushman P.C.

(57) ABSTRACT

A method and a device for generating and reporting an Overload Indicator (OI) report. A controller jointly carries out conversion of a number system on a binary number used by an OI value in each Physical Resource Block (PRB) group indicated by a set grouping tag value. The controller converts a value generated by the conversion of the number system into a new binary number, and joints the new binary number in each PRB to generate the OI report. The controller carries out the above operations according to all the set grouping tag values, and compares the number of bits occupied by the OI report corresponding to each grouping tag value to select a PRB grouping mode corresponding to the OI report occupying the least number of bits as the OI format of the controller.

19 Claims, 3 Drawing Sheets

METHOD AND DEVICE FOR GENERATING AND REPORTING OVERLOAD INDICATOR REPORT

CROSS-REFERENCE TO RELATED APPLICATION

This application is the U.S. national phase of PCT Application No. PCT/CN2009/074151 filed Sep. 23, 2009, which claims priority to Chinese Application No. 200910079421.7 filed Mar. 10, 2009, the disclosures of which are incorporated in their entirety by reference herein.

TECHNICAL FIELD

The present invention relates to the filed of Long Term Evolution (LTE) of the 3rd Generation Partnership Project (3GPP), and particularly, to a method and device for generating and reporting an Overload Indicator (OI) report.

BACKGROUND OF THE RELATED ART

In the next generation wideband wireless communication network, how to solve the inter-cell interference in the wireless communication network becomes one key factor of whether the User Terminal (UT) throughput among cells and the average UT throughput can be improved.

At present, the Institute of Electrical and Electronics Engineers (IEEE) 802.16j, the International Mobile Telecommunications-Advanced (IMT-Advanced) and the Wireless World Initiative New Radio (WINNER) put forward methods such as the interference randomization, interference coordination, and interference cancellation and so on to solve the problem of the inter-cell interference.

The LTE suggests dividing the coverage area of a certain cell into an inner layer and an outer layer according to the interference on the UTs of this cell induced by the adjacent cells of this cell. The inner layer is an area without inter-cell interference, and adopts full power compensation to solve the problem of inter-cell interference; and the outer layer is the area having the inter-cell interference, and adopts the part power control and path loss compensation to solve the problem of the inter-cell interference, wherein the part power control and path loss compensation belong to the interference coordination method.

Besides, the LTE suggests adopting the OI to indicate the interference state of the Physical. Resource Block (PRB) occupied by the UT which endures high level inter-cell interference and generate an OI report, transferring the OI report among different Base Stations (BSs) in the coverage range of the wireless communication network to negotiate the interference state of the PRB, and then adopting a certain measure to make the inter-cell interference on this PRB to be reduced efficiently, and finally achieving the object of coordinating the inter-cell interference, wherein the OI report is for indicating interference states of all the PRBs occupied by the UT.

The OI is defined by the LTE as follows: each PRB is configured with one OI value, and this OI value is classified into 3 levels 2, 1, and 0, which respectively represent that the current interference state of the PRB is high interference, middle interference and low interference; and each OI value is denoted by 2 bits, namely "10" represents the "high" interference, "01" represents the "middle" interference and "00" represents the "low" interference. The OI report is a set of the OI values of all the PRBs occupied by the UT. Since an OI value is denoted by a binary number, correspondingly, the OI report is also denoted by the binary number.

However, because 2 bits have four representation modes "11", "10", "01" and "00", and can respectively represent four interference states, but the LTE only uses three interference states, so there is one state unused, which means the OI report doesn't have all the occupied bits fully used. However, the more number of bits is used, the more resources of the system are wasted, and the more system overhead is required.

SUMMARY OF THE INVENTION

In view of this, the main object of the present invention is to provide a method and device for automatically generating and optimizing an OI report format which reduces the system overhead and decreases the OI report used bits.

In order to achieve the above object, the technical scheme of the present invention is implemented as follows:

A method for generating and reporting an overload indicator report comprises:

a controller jointly carrying out conversion of a number system on a binary number used by an overload indicator value in each physical resource block group indicated by a set grouping tag value;

said controller converting a value generated by the conversion of the number system into a new binary number, and jointing the new binary number in each physical resource block group to generate the overload indicator report; and said controller adding 1 into the grouping tag value to be a current grouping tag value, and judging whether the current grouping tag value is more than the number of all the physical resource blocks occupied by a user, and if yes, said controller comparing the number of bits occupied by the overload indicator report corresponding to each grouping tag value, and selecting a physical resource block grouping mode corresponding to the overload indicator report which occupies the least number of bits as an overload indicator report format of said controller; otherwise said controller carrying out the conversion of the number system over again.

In the above method, when said controller is a base station, said user is a relay station or a user terminal.

In the above method, when said controller is a relay station, said user is a user terminal; and before said relay station carries out the conversion of the number system at the first time, said method can further comprise:

a base station specifying an overload indicator report format generating mode used by said relay station, and sending this overload indicator report format generating mode to said relay station; and said relay station receiving said overload indicator report format generating mode sent by said base station, and judging whether the received overload indicator report format generating mode is a fixed mode, and if yes, said relay station extracting parameters included in said overload indicator report format generating mode: a fixed physical resource block grouping mode and a fixed binary number, and using this fixed physical resource block grouping mode as the overload indicator report format generating mode of said relay station, and using this fixed binary number to generate the overload indicator report, and then ending a current processing flow chart; otherwise said relay station carrying out the conversion of the number system over again.

In the above method, said fixed physical resource block grouping mode is the physical resource block grouping mode corresponding to the overload indicator report which occupies the least number of bits.

In the above method, a formula of said conversion of the number system is $$N = \sum_{i=1}^{n} X_{i-1} \times O^{i-1},$$

wherein n is the grouping tag value; $X_{i-1}$ is the overload indicator value of the $i^{th}$ physical resource block in the group; and O is a regulated grading number of the overload indicator value.

In the above method, said $X_{i-1}$ is any one of 0, 1, and 2, and said O is 3.

In the above method, said grouping tag value is set to 2 at the first time.

A device for generating and reporting an overload indicator report comprises:

a number system converting module, which is configured to jointly carry out conversion of a number system on a binary number used by an overload indicator value in each physical resource block group indicated by a set grouping tag value, and then convert a value generated by the conversion of the number system into a new binary number, and joint the new binary number in each physical resource block group to generate the overload indicator report;

a grouping tag value judging module, which is configured to add 1 into the grouping tag value to be a current grouping tag value, and judge whether the current grouping tag value is more than the number of all the physical resource blocks occupied by a user, and if yes, initiate a physical resource block grouping mode selecting module; or initiate said number system converting module; and the physical resource block grouping mode selecting module, which is configured to compare the number of bits occupied by the overload indicator report corresponding to each grouping tag value, and select a physical resource block grouping mode corresponding to the overload indicator report which occupies the least number of bits as an overload indicator report format.

In the device, when said controller is a base station, said user is a relay station or a user terminal.

In the device, when said controller is a relay station, said user is a user terminal; and said device can further comprise:

an overload indicator report format generating mode specifying module, which is configured to specify an overload indicator report format generating mode used by said relay station;

an overload indicator report format generating mode receiving module, which is configured to receive said overload indicator report format generating mode sent by said overload indicator report format generating mode specifying module;

an overload indicator report format generating mode judging module, which is configured to when the received overload indicator report format generating mode is judged as a fixed mode, initiate an overload indicator report format determining module; and when the received overload indicator report format generating mode is judged as an automatically generating and optimizing mode, initiate said number system converting module; and the overload indicator report format determining module, which is configured to when the overload indicator report format generating mode is the fixed mode, extract parameters included in said overload indicator report format generating mode: a fixed physical resource block grouping mode and a fixed binary number, and use this fixed physical resource block grouping mode as the overload indicator report format generating mode of said relay station, and use this fixed binary number to generate the overload indicator report.

According to the above technical scheme, it can be seen that the present invention automatically groups the PRB occupied by the RS or UT at first, and then the binary numbers used by the OI value in each PRB group are jointly converted in number systems, and the number system converted numbers are converted into the binary numbers over again, and the new binary numbers in each PRB group are jointed to generate the OI report, and finally the PRB group mode corresponding to the OI report which occupies the least number of bits is selected as the final OI report format, and thereby the system resources is saved and the system overhead is efficiently reduced.

PREFERRED EMBODIMENTS OF THE PRESENT INVENTION

The present invention will be further described in detail as follows.

The present invention is mainly applied in the relay network with the Relay Station (RS). In the relay network, the BS, as a controller, is required to use the OI report to indicate the interference state of each PRB occupied by a user, wherein said user is the BS served RS or UT which suffers from interference; besides, when the RS acts as the controller, the RS is also required to use the OI report to indicate the interference state of each PRB occupied by a user, wherein said user is the RS served UT which is interfered with.

Therefore, the method for automatically generating and optimizing the OI report format comprises two aspects: one is the method for automatically generating and optimizing the OI report format for the BS; and the other is the method for automatically generating and optimizing the OI report format for the RS.

Figure 1:
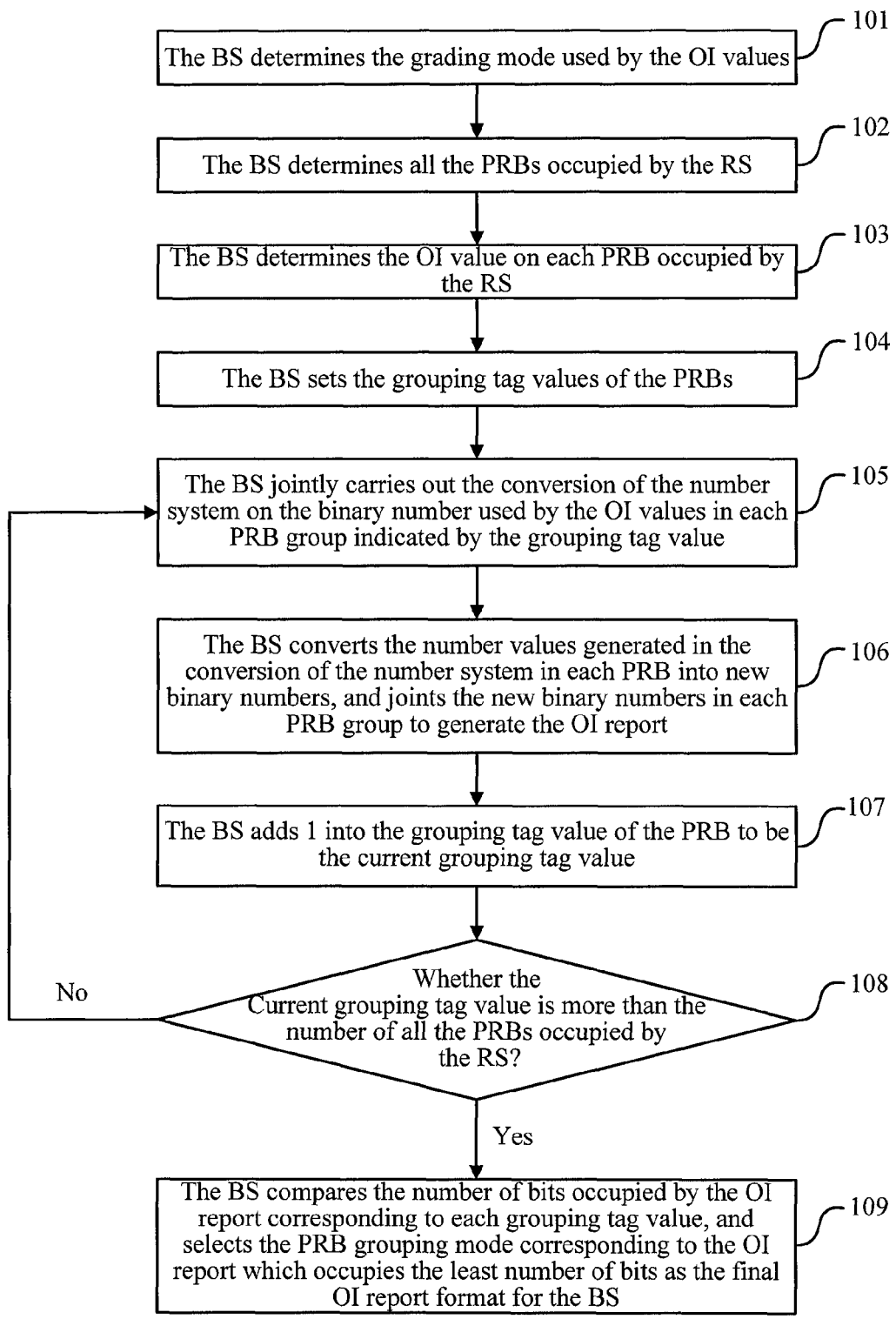
FIG. 1 is an implementing flow chart of the method for automatically generating and optimizing the OI report format of the BS according to the present invention.

As shown in FIG. 1, the method for automatically generating and optimizing the OI report format for the BS comprises the following steps:

Step 101, the BS determines the grading mode used by the OI values.

Wherein the grading mode used by the OI values can be flexibly set according to the network requirement. For example, in LTE, it is specified that the OI values are set to be in 3 grades, which respectively are "high", "middle", and "low".

Step 102, the BS determines all the PRBs occupied by the RS which is served by the BS itself.

Step 103, the BS determines the OI value on each PRB occupied by the RS, and every OI value is denoted by a 2-bit binary number.

Wherein, such information as the number of the PRBs occupied by the RS and the OI value on each PRB is reported to the BS by the RS.

Step 104, the BS sets the grouping tag values of the PRBs, where the grouping tag value set at the first time is called as the Grouping Tag Initial Value (GTIV).

Wherein, the GTIV can be set freely as long as the GTIV is not more than the number of the PRBs occupied by the RS. For example, when the RS occupies 60 PRBs, the GTIV can be set to 1, which denotes 1 PRB composes one group; and the GTIV can also be set to 2, which denotes 2 continuous PRBs compose one group. However, when the GTIV is set to 1, it means that the PRB is not grouped, and in this case the number of bits occupied for generating the OI report is not different from that in the prior art; so the GTIV is preferably set to 2.

Setting the grouping tag value is for the purpose of calculating that in which PRB grouping case, the OI report generated by binary numbers occupies the least number of bits.

Step 105, the BS jointly carries out the conversion of the number systems on the binary numbers used by the OI values in each PRB group indicated by the grouping tag value.

Herein, the formula adopted in the conversion of the number systems is:

$$N = \sum_{i=1}^{n} X_{i-1} \times O^{i-1},$$

wherein n is the grouping tag value, which indicates there are n continuous PRBs in one group; $X_{i-1}$ is the OI value of the $i^{th}$ PRB in the group; and O is the regulated grading number of the OI value, and it is 3 in the LTE.

How to carry out the conversion of the number systems will be illustrated with an example in the following. When the grouping tag value is 2, it indicates that two continuous PRBs are grouped to one group. On the assumption that the interference states of the first PRB and the second PRB are respectively middle and high, the OI values denoted by the binary numbers are respectively 01 and 10; and when the binary numbers are converted into other number systems, for example the decimal number, the 01 and 10 are converted into the decimal numbers at first, namely 1 and 2 respectively, and then the two OI values in this PRB group are jointly converted into the decimal number, namely $N=X_0 \times 3^0 + X_1 \times 3^1 = 1 \times 3^0 + 2 \times 3^1 = 7$.

Step 106, the BS converts the number values generated by conversion of the number systems in each PRB into new binary numbers, and joints the new binary numbers in each PRB group to generate the OI report.

Continuing the example given in step 105, the decimal number 7 is converted into the binary number 111. It can be found that four bits are required to denote the interference states of 2 continuous PRBs in the prior art, while, in the present invention, if the way of 2 continuous PRBs being grouped into one group is adopted, it just needs 3 bits to denote the interference states of 2 continuous PRBs, thus 1 bit can be spared. When the RS occupies more PRBs, the overhead saving in this system will be more obvious. For example, when there are 10 PRBs, 20 bits are required to denote interference states of 10 PRBs in the prior art, while in the present invention, if the way of 2 continuous PRBs being grouped into one group is adopted, and if the OI values of each PRB group are respectively 01 and 10, it just needs 3×5=15 bits to denote interference states of 10 PRBs, which obviously decreases the occupied number of bits when the OI report is generated using the binary numbers.

The example given herein is just to illustrate the process of the conversion of the number systems, and it can not be understood that when the PRBs are grouped two by two, the spared number of bits during generating the OI report is the least. It will mention that the present invention also has other PRB grouping modes in the following steps. It does not exclude that in other PRB grouping modes, the spared number of bits during generating the OI report may be less than that in the two by two grouping mode, and therefore, the PRB grouping should be optimized.

Step 107, the BS adds 1 into the grouping tag value of the PRB to be the current grouping tag value.

Step 108, the BS judges whether the current grouping tag value is more than the number of all the PRBs occupied by the RS, and if yes, the step 109 is carried out, otherwise the step 105 is returned.

Wherein the step 108 is for the purpose of carrying out various groupings on the PRBs occupied by the RS, and then calculations as in steps 105 and 106 are performed on the different PRB groupings.

Step 109, the BS compares the number of bits occupied by the OI report which is generated by the new binary number corresponding to each grouping tag value, and selects the PRB grouping mode corresponding to the OI report which occupies the least number of bits as the final OI report format of BS.

At the same time when the final. OI report format is obtained, the BS accordingly generates the OI report according to the interference state of each PRB occupied by the interfered RS in the coverage range of the BS itself, and this kind of OI report occupies the least number of bits. Afterwards, the BS can send this OI report to other BS in the relay network to carry out negotiation to reduce the inter-cell interference.

Since the RS has the dual characteristics in the relay network, for the BS to which the RS belongs, the RS is equivalent to the UT, and thus the BS processes the PRBs occupied by the UT served by the BS itself similarly to its processing on the PRBs occupied by the RS served by the BS itself, so it will not give unnecessary details any more herein. But it should be noted that the difference of the former and the latter is: when the BS determines all the PRBs occupied by the UT and the OI value on each PRB occupied by the UT, such information as the number of the PRBs occupied by the UT and the OI value of each PRB is reported to the BS by the UT.

Beside, for the UT served by the RS itself, the RS is also equivalent to the BS, so the RS is also required to use the OI report to indicate the interference state of each PRB occupied by the interfered UT served by the RS itself, and correspondingly, there is also the generating and optimizing of the OI report format for the RS.

Figure 2:
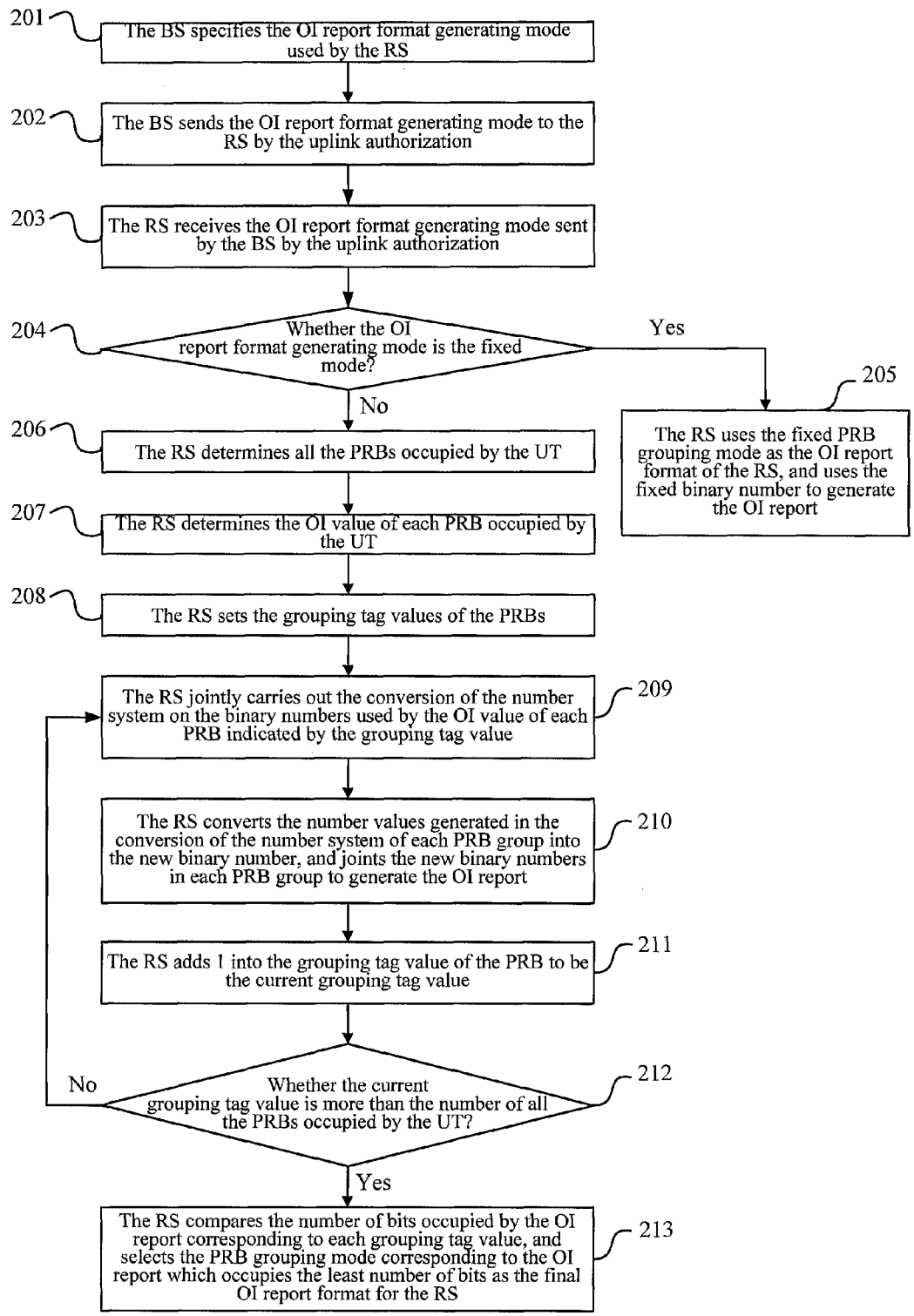
FIG. 2 is an implementing flow chart of the method for automatically generating and optimizing the OI report format of the RS according to the present invention.

As shown in FIG. 2, the method for generating and optimizing the OI report format for the RS comprises the following steps:

Step 201, the BS specifies the OI report format generating mode used by the RS which is served by the BS itself.

Since the service of the RS is controlled by the BS to which the RS belongs in a great extent, which OI report format generating mode is used by the RS is determined by the BS.

Wherein there are two OI report format generating modes, and one is the fixed mode, namely the BS directly specifies some fixed PRB grouping mode and fixed binary numbers for use by the RS to generate the OI report; and the other is the BS specifies the OI report automatically generating and optimizing mode for use by RS.

Step 202, the BS sends the OI report format generating mode to the RS by the uplink authorization.

If the sent OI report format generating mode is the fixed mode, the parameters included in the sent OI report format generating mode include: the fixed PRB grouping mode, and the fixed binary numbers for generating the OI report.

Step 203, the RS receives the OI report format generating mode sent by the BS by the uplink authorization.

Step 204, the RS judges whether the OI report format generating mode is the fixed mode, and if yes, the step 205 is carried out, otherwise it is the automatically generating and optimizing mode, and step 206 is carried out.

Step 205, the RS extracts the parameters included in the OI report format generating mode: the fixed PRB grouping mode and the fixed binary number, and uses this fixed PRB grouping mode as the OI report format of the RS; besides, the RS also uses this fixed binary number to generate the OI report, and afterwards, the current processing flow chart is ended.

Here, it should be noted that if the OI report format generating mode sent to the RS by the BS is the fixed mode, it indicates that the optimal section of the grouping of the PRBs occupied by the UT and the grouping mode is completed by the BS. In particular, the UT reports the PRB occupied by the UT itself and the OI value of each PRB to the RS to which the UT belongs, and then the RS reports to the BS to which the RS belongs; and the BS groups the PRBs occupied by the UT and selects the optimized PRB grouping mode. This flow chart is similar to that shown in FIG. 1, so it will not give unnecessary details any more herein. Afterwards, the BS sends this optimized PRB grouping mode and the binary numbers for generating the OI report corresponding to this optimized PRB grouping mode to the RS. Therefore, the fixed PRB grouping mode is PRB grouping mode corresponding to the OI report which occupies the least number of bits, and the fixed binary numbers are the binary numbers for generating the OI report using the least number of bits.

Step 206, the RS determines all the PRBs occupied by the UT served by the RS itself.

Step 207, the RS determines the OI value of each PRB occupied by the UT, and each OI values is denoted by a 2-bit binary number.

Wherein such information as the number of the PRBs occupied the UT and the OI value on each PRB is reported to the RS by the UT.

Step 208, the RS sets the grouping tag values of the PRBs, and similarly, the grouping tag value set at the first time is called as the GTIV.

Step 209, the RS jointly carries out the conversion of the number systems on the binary numbers used by the OI value of each PRB indicated by the grouping tag value.

Step 210, the RS converts the number values generated in the conversion of the number systems of each PRB group into the new binary numbers, and joints the new binary numbers in each PRB group to generate the OI report.

Step 211, the RS adds 1 into the grouping tag value of the PRB to be the current grouping tag value.

Step 212, the RS judges whether the current grouping tag value is more than the number of all the PRBs occupied by the UT, and if yes, the step 213 is carried out, or else step 209 is returned to.

Step 213, the RS compares the number of bits occupied by the OI report which is generated by the new binary number corresponding to each grouping tag value, and selects the PRB grouping mode corresponding to the OI report which occupies the least number of bits as the final OI report format of RS.

Wherein steps 206~213 are similar to steps 104~109 respectively, and therefore it will not give unnecessary details any more herein.

At the same time when the final OI report format is obtained, the RS accordingly generates the OI report according to the interference state of each PRB occupied by the interfered UT in the coverage range of the RS itself, and this OI report occupies the least number of bits. Afterwards, the RS sends this OI report to other BS in the relay network to carry out negotiation to reduce the inter-cell interference.

It can be found from the above flow chart of the method for generating and optimizing the OI report format for the RS that the processing on the PRBs occupied by the UT served by the RS can be implemented by the BS to which the RS belongs, and the BS sends the optimized PRB grouping mode in the processing result to the RS as the OI report format of the RS; and the BS can also instruct the RS to implement the PRB processing and select the optimal PRB grouping mode as the final OI report format for the RS by the RS itself. In these two cases, the OI reports generated by the RS occupy the least number of bits.

Figure 3:
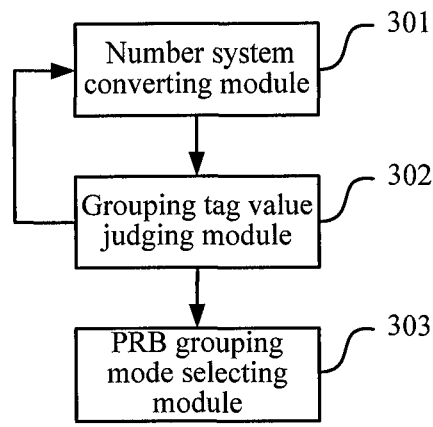
FIG. 3 is a device schematic diagram of a device for automatically generating and optimizing the OI report format according to the present invention.

In order to implement the method for automatically generating and optimizing the OI report format for the BS, the present invention correspondingly provides a device for automatically generating and optimizing the OI report format. As shown in FIG. 3, this device comprises:

a number system converting module 301, which is used for jointly carrying out the conversion of the number systems on the binary numbers used by the OI values in each PRB group indicated by the set grouping tag values, and then converting the values generated in the conversion of the number systems in each PRB group into new binary numbers, and jointing the new binary numbers in each PRB group to generate the OI report;

a grouping tag value judging module 302, which is used for adding 1 into the grouping tag value of the PRB to be the current grouping tag value; and judging whether the current grouping tag value is more than the number of all the PRBs occupied by users, and if yes, initiating the PRB grouping mode selecting module 303, or initiating the number systems converting module 301; and a PRB grouping mode selecting module 303, which is used for comparing the number of bits occupied by the OI report corresponding to each grouping tag value, and selecting a PRB grouping mode corresponding to the OI report which occupies the least number of bits as the OI report format for the BS.

Figure 4:
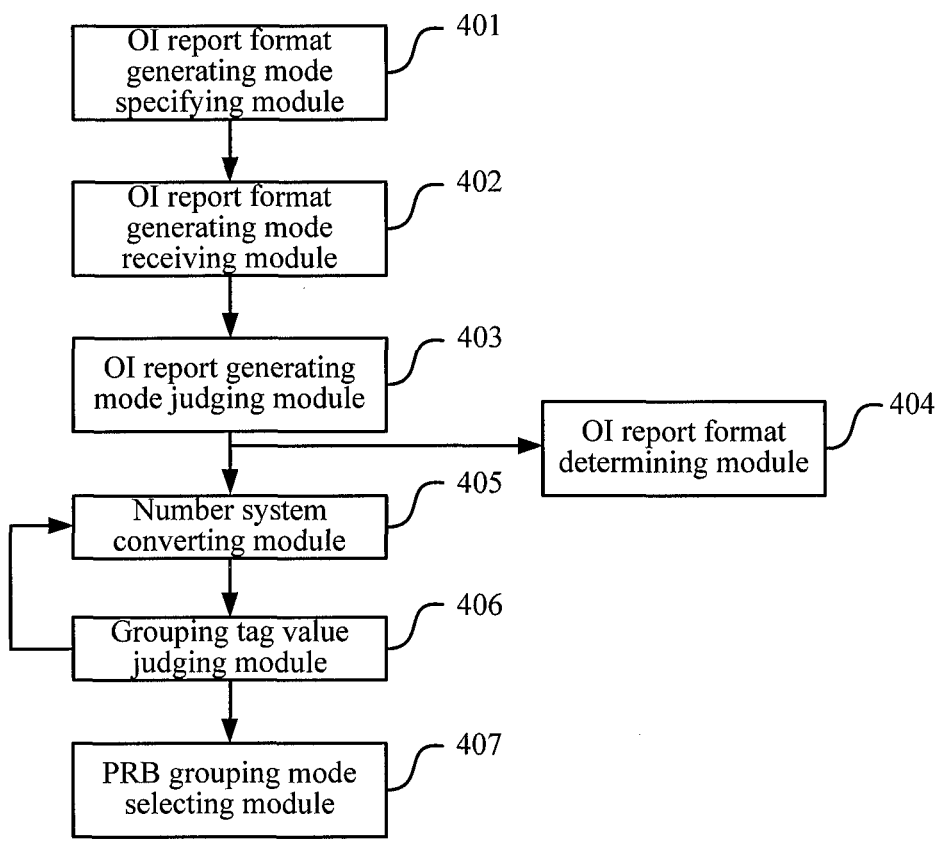
FIG. 4 is a schematic diagram of another device for automatically generating and optimizing the OI report format according to the present invention.

In order to implement the method for automatically generating and optimizing the OI report format for the RS, the present invention correspondingly provides a device for automatically generating and optimizing the OI report format. As shown in FIG. 4, this device comprises:

an OI report format generating mode specifying module 401, which is used for specifying the OI report format generating mode;

an OI report format generating mode receiving module 402, which is used for receiving the OI report format generating mode sent by the OI report format generating mode specifying module 401;

an OI report format generating mode judging module 403, which is used for initiating the OI report format determining module 404 when the received OI report format generating mode is judged as the fixed mode, and initiating the number system converting module 405 when the received OI report generating mode is judged as the automatically generating and optimizing mode;

an OI report format determining module 404, which is used for, when the OI report format generating mode is the fixed mode, extracting the parameters included in the OI report format generating mode: the fixed PRB grouping mode and the fixed binary number, and adopting this fixed PRB grouping mode as the OI report format for the RS, and adopting this fixed binary number to generate the OI report;

a number system converting module 405, which is used for, when the OI report format generating mode is the automatically generating and optimizing mode, jointly carrying out the conversion of the number systems on the binary numbers used by the OI values in each PRB group indicated by the set grouping tag value, and then converting the value generated in the conversion of the number systems in each PRB group into the new binary numbers, and jointing the new binary numbers in each PRB group to generate the OI report;

a grouping tag value judging module 406, which is used for adding 1 into the grouping tag value of the PRB to be the current grouping tag value; and judging whether the current grouping tag value is more than the number of all the PRBs occupied by users, and if yes, initiating the PRB grouping mode selecting module 407, otherwise initiating the number system converting module 405; and a PRB grouping mode selecting module 407, which is used for comparing the number of bits occupied by the OI report corresponding to each grouping tag value, and selecting the PRB grouping mode corresponding to the OI report which occupies the least number of bits as the OI report format for the BS.

The above description is only the preferred examples, which is not for limiting the protection scope of the present invention.

INDUSTRIAL APPLICABILITY

According to the above technical scheme, it can be seen that the present invention automatically groups the PRB occupied by the RS or UT at first, and then the binary numbers used by the OI value in each PRB group are jointly converted in number systems, and the numbers converted in number systems are converted into the binary numbers over again, and the new binary numbers in each PRB group are jointed to generate the OI report, and finally the PRB group mode corresponding to the OI report which occupies the least number of bits is selected as the final OI report format, and thereby the system resources is saved and the system overhead is efficiently reduced.

What is claimed is:

1. A method for generating and reporting an overload indicator report, and said method comprising:

a controller carrying out conversion to a decimal value of a binary number used by an overload indicator value in each physical resource block group indicated by a set grouping tag value;

said controller converting a decimal value generated by the conversion into a new binary number, and joining a new binary number in each physical resource block group to generate the overload indicator report; and said controller adding 1 into the grouping tag value to be a current grouping tag value, and judging whether the current grouping tag value is more than the number of all physical resource blocks occupied by a user, and if yes, said controller comparing the number of bits occupied by the overload indicator report corresponding to each grouping tag value, and selecting a physical resource block grouping mode corresponding to the overload indicator report which occupies the least number of bits as an overload indicator report format of said controller; otherwise said controller carrying out the conversion over again based on a current grouping tag value.

2. The method as claimed in claim 1, wherein when said controller is a base station, said user is a relay station or a user terminal.

3. The method as claimed in claim 2, wherein a formula used for said conversion is $$N = \sum_{i=1}^{n} X_{i-1} \times O^{i-1},$$

wherein n is a grouping tag value; $X_{i-1}$ is an overload indicator value of an $i^{th}$ physical resource block in a group; and O is a regulated grading number of the overload indicator value.

4. The method as claimed in claim 3, wherein said $X_{i-1}$ is any one of 0, 1, and 2, and said O is 3.

5. The method as claimed in claim 2, wherein said grouping tag value is set to 2 at the first time.

6. The method as claimed in claim 1, wherein when said controller is a relay station, said user is a user terminal; and before said relay station carries out the conversion of the number system at the first time, said method further comprises:

a base station specifying an overload indicator report format generating mode used by said relay station, and sending this overload indicator report format generating mode to said relay station; and said relay station receiving said overload indicator report format generating mode sent by said base station, and judging whether the received overload indicator report format generating mode is a fixed mode, and if yes, said relay station extracting parameters included in said overload indicator report format generating mode: a fixed physical resource block grouping mode and a fixed binary number, and using this fixed physical resource block grouping mode as the overload indicator report format generating mode of said relay station, and using this fixed binary number to generate the overload indicator report, and then ending a current processing flow chart; otherwise said relay station carrying out the conversion over again.

7. The method as claimed in claim 6, wherein said fixed physical resource block grouping mode is the physical resource block grouping mode corresponding to the overload indicator report which occupies the least number of bits.

8. The method as claimed in claim 7, wherein a formula used for said conversion is $$N = \sum_{i=1}^{n} X_{i-1} \times O^{i-1},$$

wherein n is a grouping tag value; $X_{i-1}$ is an overload indicator value of an $i^{th}$ physical resource block in a group; and O is a regulated grading number of the overload indicator value.

9. The method as claimed in claim 8, wherein said $X_{i-1}$ is any one of 0, 1, and 2, and said O is 3.

10. The method as claimed in claim 7, wherein said grouping tag value is set to 2 at the first time.

11. The method as claimed in claim 6, wherein a formula used for said conversion is $$N = \sum_{i=1}^{n} X_{i-1} \times O^{i-1},$$

wherein n is a grouping tag value; $X_{i-1}$ is an overload indicator value of an $i^{th}$ physical resource block in a group; and O is a regulated grading number of the overload indicator value.

12. The method as claimed in claim 11, wherein said $X_{i-1}$ is any one of 0, 1, and 2, and said O is 3.

13. The method as claimed in claim 6, wherein said grouping tag value is set to 2 at the first time.

14. The method as claimed in claim 1, wherein a formula used for said conversion is $$N = \sum_{i=1}^{n} X_{i-1} \times O^{i-1},$$

wherein n is a grouping tag value; $X_{i-1}$ is an overload indicator value of an $i^{th}$ physical resource block in a group; and O is a regulated grading number of the overload indicator value.

15. The method as claimed in claim 14, wherein said $X_{i-1}$ is any one of 0, 1, and 2, and said O is 3.

16. The method as claimed in claim 1, wherein said grouping tag value is set to 2 at the first time.

17. A device for generating and reporting an overload indicator report, and said device comprising:
   a number system converting module, which is configured to carry out conversion to a decimal value of a binary number used by an overload indicator value in each physical resource block group indicated by a set grouping tag value, and then convert a decimal value generated by the conversion into a new binary number, and join a new binary number in each physical resource block group to generate the overload indicator report;
   a grouping tag value judging module, which is configured to add 1 into the grouping tag value to be a current grouping tag value, and judge whether the current grouping tag value is more than the number of all physical resource blocks occupied by a user, and if yes, initiate a physical resource block grouping mode selecting module; or initiate said number system converting module; and
   the physical resource block grouping mode selecting module, which is configured to compare the number of bits occupied by the overload indicator report corresponding to each grouping tag value, and select a physical resource block grouping mode corresponding to the overload indicator report which occupies the least number of bits as an overload indicator report format.

18. The device as claimed in claim 17, wherein when said device is a base station, said user is a relay station or a user terminal.

19. The device as claimed in claim 17, wherein when said device is a relay station, said user is a user terminal; and said device further comprises:
   an overload indicator report format generating mode specifying module, which is configured to specify an overload indicator report format generating mode used by said relay station;
   an overload indicator report format generating mode receiving module, which is configured to receive said overload indicator report format generating mode sent by said overload indicator report format generating mode specifying module;
   an overload indicator report format generating mode judging module, which is configured to, when the received overload indicator report format generating mode is judged as a fixed mode, initiate an overload indicator report format determining module; and, when the received overload indicator report format generating mode is judged as an automatically generating and optimizing mode, initiate said number system converting module; and
   the overload indicator report format determining module, which is configured to, when the overload indicator report format generating mode is the fixed mode, extract parameters included in said overload indicator report format generating mode: a fixed physical resource block grouping mode and a fixed binary number, and use this fixed physical resource block grouping mode as the overload indicator report format generating mode of said relay station, and use this fixed binary number to generate the overload indicator report.

* * * * *